United States Patent [19]
Haggerty

[11] Patent Number: 6,117,323
[45] Date of Patent: Sep. 12, 2000

[54] PROCESS FOR THE BIOLOGICAL TREATMENT OF WASTEWATER WITH PERIODS OF BIOMASS STARVATION

[76] Inventor: Ken Haggerty, 37 Hi Mount Drive, Willowdale, Ontario, Canada, M2K 1X3

[21] Appl. No.: 09/040,706

[22] Filed: Mar. 18, 1998

Related U.S. Application Data

[60] Provisional application No. 60/041,074, Mar. 18, 1997.

[51] Int. Cl.[7] ........................................ C02F 3/30
[52] U.S. Cl. ..................... 210/605; 625/630; 625/903; 625/900
[58] Field of Search ................ 210/605, 615–617, 210/620–629, 630, 903, 906, 921, 612

[56] References Cited

U.S. PATENT DOCUMENTS

| | | | |
|---|---|---|---|
| 2,788,127 | 4/1957 | Davidson | 210/605 |
| 2,875,151 | 2/1959 | Davidson | 210/605 |
| 3,440,669 | 4/1969 | Boester | 210/608 |
| 3,543,294 | 11/1970 | Boester | 210/609 |
| 4,046,465 | 9/1977 | Spector | 210/605 |
| 4,487,697 | 12/1984 | Bohnke et al. | 210/620 |
| 4,488,967 | 12/1984 | Block et al. | 210/605 |
| 4,522,722 | 6/1985 | Nicholas | 210/605 |
| 4,568,462 | 2/1986 | Bohnke et al. | 210/620 |
| 4,824,572 | 4/1989 | Scott | 210/605 |
| 5,290,435 | 3/1994 | Stilkenboom | 210/903 |
| 5,344,562 | 9/1994 | Lorenz et al. | 210/605 |
| 5,354,471 | 10/1994 | Timpany et al. | 210/607 |
| 5,395,527 | 3/1995 | Desjardins | 210/608 |
| 5,454,949 | 10/1995 | Davis et al. | 210/617 |
| 5,480,548 | 1/1996 | Daigger et al. | 210/605 |
| 5,525,231 | 6/1996 | Ho et al. | 210/620 |
| 5,861,095 | 1/1999 | Vogel et al. | 210/605 |

FOREIGN PATENT DOCUMENTS

| | | |
|---|---|---|
| 1064169 | 10/1979 | Canada . |
| 1096976 | 3/1981 | Canada . |
| 1198837 | 12/1985 | Canada . |
| 1304839 | 7/1992 | Canada . |
| 1307059 | 9/1992 | Canada . |
| 2041329 | 5/1994 | Canada . |

*Primary Examiner*—Thomas G. Wyse
*Attorney, Agent, or Firm*—Michael Best & Freidrich, LLP

[57] ABSTRACT

A biological treatment of wastewater from intermittent and/or sporadic sources is described. The process includes the step of: maintaining treated wastewater effluent and biomass in a quiescent state without stirring, aeration or agitation during biomass starvation wherein said biomass retains the capacity for biological wastewater treatment following the period of prolonged biomass starvation.

15 Claims, 2 Drawing Sheets

PROCESS FOR THE BIOLOGICAL TREATMENT OF WASTEWATER WITH PERIODS OF BIOMASS STARVATION

This application claims benefit of Provisional Application 60/041,074, filed Mar. 18, 1997.

FIELD OF INVENTION

The present invention relates to a process for the biological treatment of wastewater with periods of biomass starvation. In particular, the present invention relates to a process for the biological treatment of wastewater with relatively long periods of biomass starvation such that the biomass is able to retain and recover its wastewater treatment capability following a period of starvation.

BACKGROUND OF INVENTION

There exists a number of biological wastewater treatment processes for the removal of COD, phosphorous and nitrogen from wastewater utilizing microorganisms contained in an activated biomass, or sludge. These treatment processes typically incorporate multiple treatment zones, namely: (1) a preliminary treatment area; (2) a primary treatment area; and (3) a secondary treatment area.

Preliminary treatment is primarily concerned with the removal of solid inorganics from untreated wastewater. Typically, this preliminary treatment encompasses a two-stage treatment process in which the debris is removed by screens and/or settling. Organic matter is carried out in the fluid stream for subsequent treatment.

Primary treatment entails a physical process wherein a portion of the organics, including suspended solids such as faeces, food particles, etc. is removed by flotation or sedimentation.

Secondary treatment typically encompasses a biological treatment process where microorganisms are utilized to remove remaining organics, nitrogen and phosphorous from the wastewater fluid stream. Microorganism growth and metabolic activity are exploited and controlled through the use of controlled growth conditions.

In large scale or industrial applications, this process typically consists of a basin in which the wastewater is mixed with a suspension of biomass/sludge. Subsequent growth and metabolism of the microorganisms, and the resultant treatment of the wastewater, is carried out under aerobic and/or anaerobic/anoxic conditions.

In most large scale municipal or industrial treatment systems, the various components of the treatment process are performed in discrete basins or reactors. As such, there is a continuous flow of the wastewater from one process step to the next. Biomass containing the active microorganisms may be recycled from one process step to another. The conditioning of such biomass to enhance growth of particularized subgroups of microorganisms possessing a proclivity for performing a specific type of metabolic process, e.g. phosphate removal, nitrogen removal has been the subject matter of numerous patents, including: U.S. Pat. No. 4,056,465; U.S. Pat. No. 4,487,697; U.S. Pat. No. 4,568,462; U.S. Pat. No. 5,344,562.

The optimization of other components or aspects of the biological wastewater treatment process has also engendered a variety of patents, including: U.S. Pat. No. 2,788,127; U.S. Pat. No. 2,875,151; U.S. Pat. No. 3,440,669; U.S. Pat. No. 3,543,294; U.S. Pat. No. 4,522,722; U.S. Pat. No. 4,824,572; U.S. Pat. No. 5,290,435; U.S. Pat. No. 5,354,471; U.S. Pat. No. 5,395,527; U.S. Pat. No. 5,480,548; Canadian Patent # 1,064,169; Canadian Patent # 1,096,976; Canadian Patent # 1,198,837; Canadian Patent # 1,304,839; Canadian Patent # 1,307,059; Canadian Patent # 2,041,329.

The Sequencing Batch Reactor (SBR) process is a modification of the conventional activated sludge process. The SBR process employs a number of discrete steps comprising the sequential fill, reaction, settlement and decantation of wastewater with biomass in an enclosed reactor. In the initial step of this process, wastewater is transferred into a reactor containing biomass, and combined to form a mixed liquor. In the reaction step of the treatment process the microorganisms of the biomass utilize and metabolize and/or take up the nitrogen, phosphorous and organic sources in the wastewater. These latter reactions may be performed under anaerobic conditions, anoxic conditions, aerobic conditions, or a combination thereof.

Following the reaction cycle, the biomass in the mixed liquor is allowed to settle out. The treated and clarified wastewater (i.e. effluent) is subsequently decanted and discharged. The reactor vessel is then refilled and the treatment process cycle reinitiated.

SBR's have been successfully used to treat wastewater generated by small communities.

A common factor in all of the aforementioned systems for wastewater treatment is the prerequisite of a fairly consistent inflow of wastewater for the maintenance of optimal treatment capability. However, the treatment problem presented by wastewater generated at cottages, or other sporadic or seasonally lived-in communities, is markedly different from that of a permanent residence due to the highly intermittent or sporadic generation and flow of wastewater.

In addition to the usual diurnal fluctuations, extreme weekly and seasonal fluctuations are expected, wherein flows will vary from nil to several times that normally expected for a single family residence. Whereas high flow events can be dealt with hydraulically, using equalization capacity, the situation is quite different for periods of no flow. During these periods the microorganisms which normally facilitate the conversion of wastes will be starved.

Recent studies of bacteria under starvation conditions have established that many microbes are capable of withstanding long periods of starvation (Kjelleberg S., Albertson N., Flärdh K., Holmquist L. Jouper-Jaan Å., Marouga R. & Osthng J. 1993. "How do non-differentiating bacteria adapt to starvation", Antoine van Leeuwenhoock 63: 333–341). In fact, this is considered to be the normal situation in nature (Morita R. Y. 1982. "Starvation-survival of heterotrophs in the marine environment", Adv. Microb. Ecol. 6: 171–198). However, these studies have involved either marine isolates or pure cultures, and so do not reflect either the environment or the ecosystem diversity present in actual sewage treatment systems.

Other studies involving starved bacteria have focused on inactivation of fecal bacteria in marine environments. These findings are not predictive of the starvation-survival in a wastewater treatment system.

Starvation in wastewater treatment systems has also been specifically examined. Chudoba et al. (Chudoba P., Chevalier J. J., Chang J. & Capdeville B. 1991. "Effect of anaerobic stabilization of activated sludge on its production under batch conditions at various So/Xo ratios", Wat. Sci. Technol. 23: 917–926) subjected return activated sludge to 8 hours of anoxia and starvation. Ford and Ekenfelder ((1967) "Effects of process variables on sludge floc formation and settling characteristics"; Journal WPCF 39:

1850–1859) studied the effects of up to 72 hours anoxic starvation on chemical oxygen demand (COD) uptake and oxygen uptake rate for the purpose of observing the effects on mixed liquor floc formation and settling. These studies demonstrated that the mixed liquor from aerobic treatment systems was capable of surviving relatively short periods of starvation and anoxia. These studies are directed at the ability of biomass to survive short term starvation. These studies do not provide any information about the design of a recovery response of an aerobic treatment system which has been starved for several weeks or months or even if it is possible.

The present practice of using septic systems to treat domestic sewage from cottages introduces soluble reactive phosphorous (SRP or $PO^{3-}_4$—P) into the soil. Although the time required for the phosphorous to migrate from the tile bed into the nearby surface waters will vary considerably due to the varying geochemical factors involved, all of the septic SRP will eventually reach surface waters (Dillion P. J. & Molot L. A. 1996. "Long term phosphorus budgets and an examination of a steady-state mass balance model for central Ontario lakes", Wat. Res. 30(10): 2273–2280). As such, a biological wastewater treatment processes offer the potential capability of removing SRP in addition to the concurrent removal of organics and nitrogen from cottage wastewater.

Therefore, there is a clear need for a biological wastewater treatment process in which the biomass/sludge is capable of withstanding relatively long periods of starvation, possessing the ability to subsequently recover biological wastewater treatment activity when restarted.

SUMMARY OF INVENTION

The present invention provides a process for the biological treatment of wastewater with relatively long periods of biomass starvation. In particular, the present invention provides a process for the biological treatment of wastewater with relatively long periods of biomass starvation such that the biomass is able to retain and recover its wastewater treatment capability following a period of starvation. In particular, the biomass will recover its ability to remove COD and also preferably nitrogen and phosphorous.

Biomass starvation is incurred in wastewater treatments which undergo intermittent wastewater flow.

According to one aspect of the invention, there is provided a process for the biological treatment of wastewater for the removal of phosphorous, nitrogen and COD, in which the capacity of the biomass to treat wastewater is retained and recovered following a period of prolonged biomass starvation.

According to another aspect of the invention, there is provided a process for the conditioning of biomass utilized in biological wastewater treatment so that the biomass retains and recovers s capacity to remove phosphorous, nitrogen and COD from wastewater following a relatively long period of starvation.

According to another aspect of the invention, there is provided a process for the biological treatment of wastewater with relatively long periods of biomass starvation comprising the step of maintaining the biomass and effluent in a quiescent state in the absence of any stirring, mixing, or aeration during biomass starvation.

According to another aspect of the invention, there is provided a process for the biological treatment of wastewater with relatively long periods of biomass starvation wherein after the biomass starvation period the process comprises the steps of: decanting the treated effluent from the biomass; creating a mixed liquor by combining the biomass with untreated wastewater; and incubating the mixed liquor in anoxic/anaerobic conditions.

According to an embodiment of the invention there is provided a suspended growth process for the biological treatment of wastewater with periods of biomass starvation, wherein after biomass starvation the process comprises the steps of:

a) decanting the effluent from the biomass;

b) creating a mixed liquor through the combining of the biomass and untreated wastewater;

c) incubating said mixed liquor in an anoxic/anaerobic stage.

d) treating the mixed liquor;

e) separating the biomass of the mixed liquor from the treated wastewater by settling;

f) and repeating steps a) to e) if there is no subsequent biomass starvation; and g) maintaining the settled biomass and effluent in a quiescent state in the absence of any stirring, mixing or aeration if there is subsequent biomass starvation.

The suspended growth process may be a sequential batch reactor process or a continuous flow process.

According to another embodiment of the invention, there is provided a fixed film process for the biological treatment of wastewater with periods of biomass starvation, wherein after biomass starvation the process comprises the steps of:

a) decanting the effluent from the biomass;

b) creating a mixed liquor by combining the biomass and wastewater; and c) incubating said mixed liquor in an anoxic/anaerobic stage;

d) treating the mixed liquor;

e) and repeating steps a) to d) if there is no subsequent biomass starvation; and f) maintaining the settled biomass and effluent in a quiescent state in the absence of any stirring, mixing or aeration if there is subsequent biomass starvation.

In a particular embodiment of the process of the present invention, the step encompassing treating the mixed liquor will remove COD and nitrogen and may further comprise the step of removing phosphorous. Furthermore, in a preferred embodiment, the step encompassing treating the mixed liquor comprises incubating the mixed liquor in anoxic/anaerobic conditions and in suspended growth processes, in a further preferred embodiment, this incubation step includes stirring.

DETAILED DESCRIPTION OF THE PREFERRED EMBODIMENT

An activated biomass treatment process of the present invention is capable of removing COD, nitrogen and phosphorous from wastewater, which is carried out in an SBR and which is subjected to sporadic and/or intermittent loading of wastewater. The process is such that the biomass is capable of withstanding prolonged periods of starvation, and possesses an ability to recover desired biological wastewater treatment activity when restarted.

The process of the present invention provides for the biomass to be conditioned so that its biological capability to treat wastewater is retained and recovered following a period of starvation.

Figure 1:
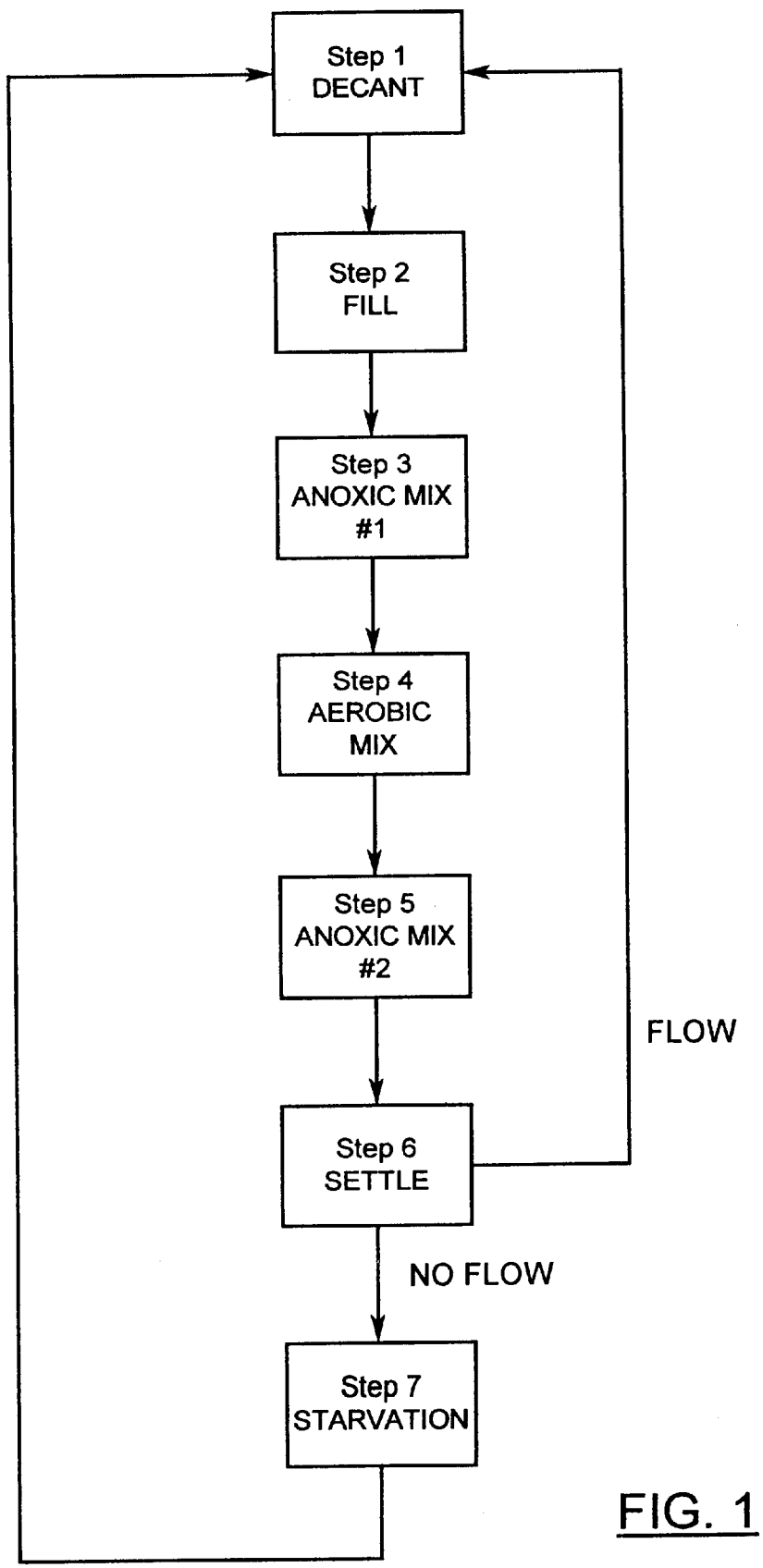
FIG. 1 is an illustration of a process flow diagram of an embodiment of the present invention for the removal of COD, nitrogen and phosphorous in sequencing batch reactors using suspended growth subjected to intermittent and/or sporadic loadings of wastewater.

FIG. 1 illustrates an embodiment of the present invention of the wastewater treatment and biomass conditioning process. Ideally, the process is carried out in a SBR.

In step 1, after settling, the effluent is decanted from the settled biomass. After decanting in step 2, the settled biomass is mixed with wastewater in the SBR to form a mixed liquor. If there had not yet been a biomass starvation or any wastewater treatment, a source of activated biomass would have to be added to the wastewater in the initial step in the SBR (not shown in Figure).

In the Anoxic mix #1 step, step 3, this biomass-wastewater mixture, which is also referred to as a mixed liquor, is allowed to incubate under anoxic/anaerobic conditions with active mixing for a prolonged period of time. It is believed that this initial prolonged incubation affects the subsequent ability of the biomass to retain and recover its wastewater treatment capability following starvation, as discussed below for reactor SBR C.

In the Aerobic Mix step, step 4, the mixed liquor subsequently undergoes an incubation period under aerobic conditions with active mixing.

In the next Anoxic step, step 5, the mixed liquor undergoes a second incubation period under anoxic conditions, with mixing. The duration of Anoxic Mix #2 step is nor believed to substantially affect the retention and/or recovery of the aforementioned treatment capability of the biomass after starvation.

The mixed liquor then undergoes a Settle step, step 6, wherein the biomass settles to the bottom of the reactor, with the treated and clarified wastewater (i.e. effluent) occupying the upper portions of the reactor vessel. Following a short idle period, the effluent is decanted from the reactor under circumstances in which there exists sufficient inflowing untreated wastewater. The settled biomass as then mixed with the inflowing untreated wastewater again in step 1.

However, in conditions where there exists insufficient or no inflow of untreated wastewater, the effluent is not decanted from the reactor and the biomass enters into a period of Starvation, step 7. During the starvation period the reactor contents are not actively mixed or aerated. When sufficient inflowing wastewater is accumulated, the effluent is decanted and the process reinitiated.

Figure 2:
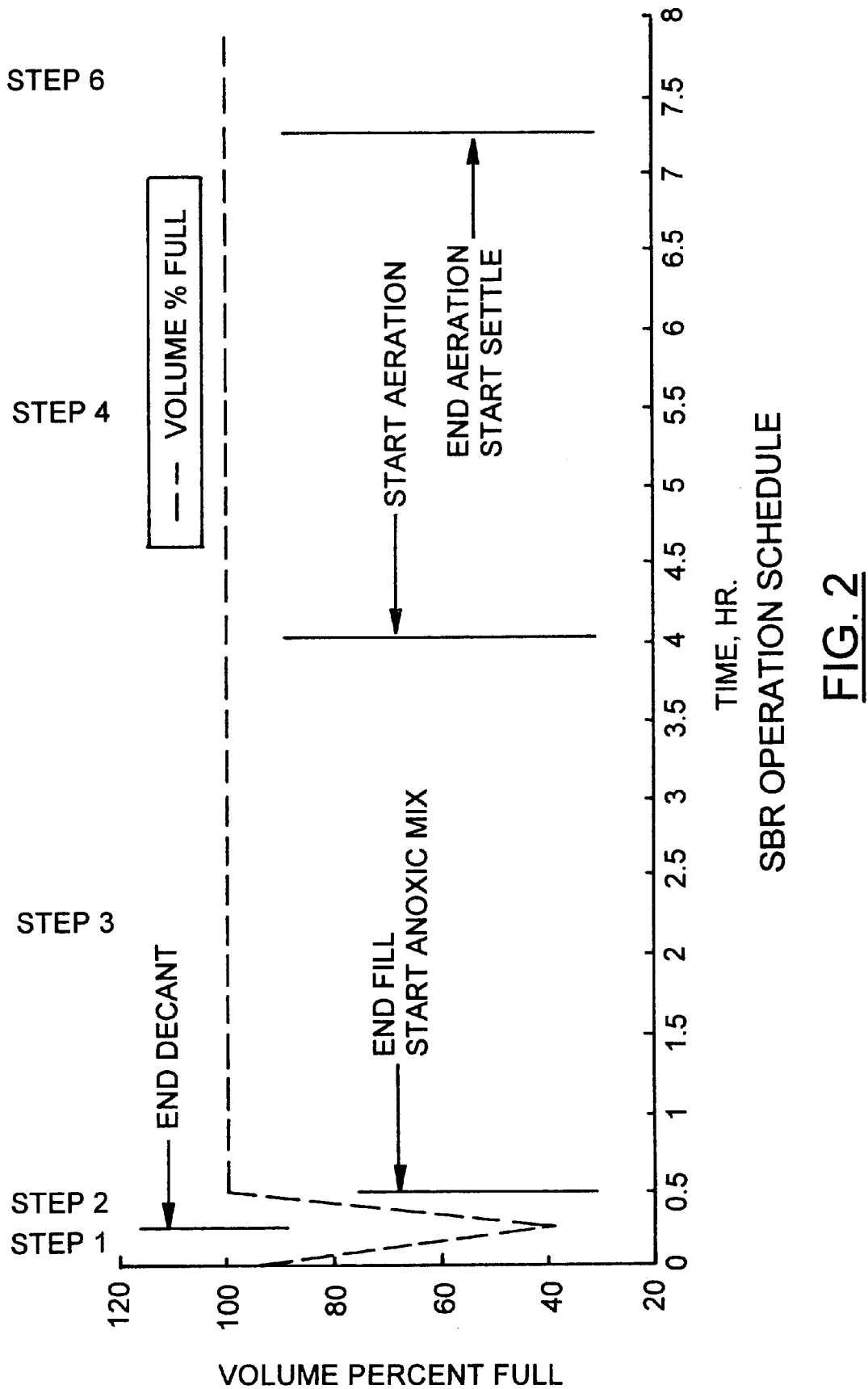
FIG. 2 is an illustration of a time versus volume of wastewater graph of the embodiment of the process of the present invention of FIG. 1, without step 5, Anoxic Mix #2.

FIG. 2 is an illustration of time versus volume of mixed liquor in the sequential batch reactor in accordance with the steps of the process illustrated in FIG. 1 for a sequential batch reactor, without step 5. If the X axis of the graph of FIG. 2 represented a location along a continuous flow treatment reactor instead of time this would also illustrate a continuous flow process.

The recovery of biomass biological activity and wastewater treatment capability to pre-starvation levels typically occurs after several weeks of normal process cycling.

It is believed that the process of the present invention could be carried out in wastewater treatment processes, other than suspended growth processes (sequential batch reactors and continuous flow reactors), such as a fixed film wastewater treatment process. In a fixed film process there is no need to settle the biomass, as is done in a suspended growth process (an embodiment of which is described above with reference to FIG. 1). Instead, using a fixed film process the attached biomass would merely be kept in a quiescent state with the effluent without stirring, agitation or aeration during biomass starvation.

The following example further illustrates the present invention and demonstrates the ability of starved sludge to retain and recover wastewater treatment capability following a period of prolonged starvation with a suspended growth treatment process. It should be understood, however, that the specific details set forth in the example are merely illustrative and are not meant to be limiting.

EXAMPLE

A number of SBRs were used to treat artificial wastewater (AWW) in accordance with the embodiment of the process of the present invention illustrated in FIG. 1, with the exception of step 5. Each SBR consisted of a 2-L Phipps and Bird jar—test vessel, modified to accommodate an AWW fill port, a supernatant withdrawal port, a paddle-type mixer with motor, an aeration line, level control, and monitoring equipment. The SBRs were maintained at 27–28° C. or 20.5–24° C. The SBR operational cycles of fill, draw, mix, and aerate were each controlled by a Noma seven day digital timer.

The AWW consisted of tap water to which the following constituents were added. Ensure Liquid Diet Food –0.77 ml/L, $NH_4Cl$—114.6 mg/L, $K_2HPO_4$–22.5 mg/L, $KH_2PO_4$—17.6 mg/L, $Na_2CO_3$—100 mg/L, $NaHCO_3$–100 mg/L, and mineral medium—2 ml/L. The AWW was prepared in 100 L lots, stored at 4° C. and continuously mixed. To avoid heat shock to the mixed liquor the AWW was passed through a heat exchanger prior to entering the SBR. The AWW storage tank and fill lines were chlorinated and rinsed on a weekly basis to prevent grow in the lines and the storage tank.

The SBRs were seeded with sludge taken from the old wastewater treatment plant in Bowmanville, Ontario. This sludge had not been treated with chemicals for phosphorous removal. All SBRs were operated with the same 8 hour overall cycle time. Prior to starvation the SBRs were operated on the following schedules (Table 1).

TABLE 1

| SBR OPERATING SCHEDULES - PRIOR TO STARVATION | | | |
| --- | --- | --- | --- |
| SBR Function | SBR A | SBR B | SBR C |
| Fill & anoxic mix (min.) - steps 2 and 3 | 120 | 120 | 210 |
| Aerate & mix (min.) - step 4 | 180 | 270 | 180 |
| Anoxic mix (min.) - step 5 | 105 | 0 | 15 |
| Settle (min.) - step 6 | 45 | 60 | 45 |
| Decant & Idle (min.) - step 1 | 30 | 30 | 30 |
| Temperature (° C.) | 27–28 | 20.5–24 | 20.5–24 |
| Full volume (L) | 2 | 2 | 2 |
| Volume (L) After Decant | 0.75 | 1 | 0.5 |
| Hydraulic Retention Time (hrs) | 12.8 | 16 | 10.67 |

After several weeks of operation the supply of AWW was discontinued, and each of the SBRs was stopped and left in a different state. SBR-A was decanted after its last cycle. It was starved for 96 days, and was stirred and aerated during this period. SBR-B was not decanted after its last cycle. It was starved for 58 days, and was neither stirred or aerated during this period. SBR-C was not decanted after its last cycle. It was starved for 84 days, and was stirred but not aerated during this period. The SBRs were then restarted on 8-hour cycles according to the schedules in Table 2 following a resupply of fresh AWW.

TABLE 2

SBR OPERATING
SCHEDULES UPON RESTART - AFTER STARVATION

| SBR Function | SBR A | SBR B | SBR C |
|---|---|---|---|
| Fill & anoxic mix (min.) - steps 2 and 3 | 210 | 210 | 210 |
| Aerate & Mix (min.) - step 4 | 180 | 180 | 180 |
| Settle (min.) - step 6 | 60 | 60 | 60 |
| Decant & Idle (min.) - step 1 | 30 | 30 | 30 |
| Temperature ° C. | 27–28 | 20.5–24 | 20.5–24 |

Analysis of the effluent was performed via standard analytical methods. Table 3 summarizes the effluent characteristics pre- and post-starvation.

TABLE 3

STEADY STATE SBR EFFLUENT CHARACTERISTICS

| CHARACTERISTIC | Wastewater Feed | PRE-STARVATION[1] | | | POST-STARVATION[2] | | |
|---|---|---|---|---|---|---|---|
| | | SBR A | SBR B | SBR C | SBR A | SBR B | SBR C |
| Filtered COD (CODf) (mg/L) | 200 | 19.5 | 22.3 | 21.8 | 23 (Day 15) | 28 (Day 2) | 22 (Day 10) |
| $NH_4$—N (mg/L) | 30 | 0.2 | 0.0 | 10.5 | 22.9 (Day 17) | 0. (Day 18) | 2.0 (Day 10) |
| $NO_3$—N (mg/L) | 0 | 13.4 | 14.2 | 5.2 | 0.0 (Day 15) | 12.0 (Day 18) | 5.5 (Day 8) |
| $PO_4^{3-}$—P(mg/L) | 0 | 6.1 | 7.9 | 5.7 | 8.0 (Day 20) | 0.4 (Day 14) | 1.2 (Day 9) |

[1]Pre-starvation refers to the characteristics of the decanted effluent prior to starvation when the process had reached a condition approximating steady state. The last four readings are averaged in Table 2.
[2]Post-starvation refers to the characteristics of the decanted effluent after a particular number of days of treating wastewater after starvation.

During the course of the studies the SBR's were individually monitored using a YSI 600XL sonde connected to a PC with datalogging software. The sonde was equipped to monitor dissolved oxygen (DO), conductivity, temperature, pH, and oxidation reduction potential (ORP) Effluent samples were collected 3 times per week and analysed for suspended solids (SS), volatile suspended solids (VSS), total COD (CODr), and soluble effluent COD (CODf), turbidity, ammonium ($NH_3$—N), nitrate ($NO_3^-$—N), and both $PO_4^{3\times}$ and total phosphorus ($P_T$). Solids were determined according to standard methods (WEF 1992), as was COD using the colorimetric method; turbidity was measured with a Hach 2100P turbidimeter, and ammonium, nitrate and phosphorus were determined with a Hach DR2000 spectrophotometer using methods prescribed by Hach. On occasion an ion selective electrode VWR 34105-120 was used to determine ammonia concentration (See: 1997, M.A.Sc. Thesis, Ken Haggerty, Use of a Sequencing Batch Reactor (SBR) for the Removal of Organics and Nutrients when Subjected to Intermittent Loading, University of Toronto)

The results confirm the viability of the invention with respect to both the retention and recovery of wastewater treatment capability following starvation, and the conditioning of the biomass.

SBR-A showed insignificant phosphorous and ammonium removal which is believed to be due to the fact that it was decanted and it was stirred and aerated SBR-B showed an improvement over SBR-A since SBR-B was not decanted and was not stirred or aerated during starvation. SBR C was the most effective for the removal of COD, nitrogen and phosphorous. It is believed that because: 1. the effluent was not decanted or aerated during starvation; and, 2. the initial anoxic incubation period was longer for SBR C than SBR B; this led to the better results for SBR C over SBR A and SBR B, respectively. Furthermore, it is believed that SBR C would have exhibited even better results if SBR C, like SBR B, was not stirred. SBR C had an initial anoxic period of approximately 210 minutes whereas SBR A and SBR B had initial anoxic periods of 120 minutes during pre-starvation conditions.

Those skilled in the art will recognize that the mean residence times of the wastewater in the anoxic/anaerobic incubation(s), aerobic incubation, or starvation period may vary between individual applications. In addition, factors such as composition, volume and characteristics of the wastewater or operating temperatures may also nominally affect some parameters of the disclosed invention.

Although the invention has been described in particular with reference to the figures and examples using a preferred embodiment involving a SBR, it is to be understood that variations and modifications may be resorted to as will be apparent to those skilled in the art. For example, the present invention may be used in a continuous film reactor and a fixed film process. Such variations and modifications are to be considered within the purview and the scope of the claims appended hereto.

I claim:

1. A process for conditioning a biomass, said biomass to be used to process a feedstock, comprising the steps of:
   1) adding a wastewater feedstock to a biomass to form a mixed liquor;
   2) permitting said mixed liquor to generate an anoxic atmosphere;
   3) mixing said mixed liquor for a first pre-determined time;
   4) aerating said mixed liquor to create an aerobic atmosphere;
   5) mixing said mixed liquor for a second pre-determined time; and
   6) holding said mixed liquor without further aeration and without further mixing to provide a regeneratable biomass for processing a wastewater feedstock in a wastewater treatment process.

2. A process as claimed in claim 1, wherein said process further includes a step of allowing said mixed liquor to generate an anoxic atmosphere for a third predetermined time.

3. A process as claimed in claim 2, wherein said third predetermined time is at least 15 minutes.

4. A process as claimed in claim 1, wherein said wastewater feedstock is a source of carbon, nitrogen and phosphorous.

5. A process as claimed in claim 1, wherein said anoxic atmosphere contains less than 0.7 ppm oxygen.

6. A process as claimed in claim 1, wherein said first pre-determined time is at least 210 minutes.

7. A process as claimed in claim 1, wherein said aerobic atmosphere contains at least 1 ppm oxygen.

8. A process as claimed in claim 1, wherein said second pre-determined time is at least 180 minutes.

9. A process as claimed in claim 1, wherein said step of holding occurs at a temperature within the range of approximately 20.5° C. to 28° C.

10. A process as claimed in claim 1, wherein said step of holding occurs at a temperature within the range of approximately 20.5° C. to 24° C.

11. A process as claimed in claim 1, wherein said step of holding is for a period of at least 60 days.

12. A process as claimed in claim 1, wherein said process further includes a step of regenerating said biomass to restore its wastewater treatment capabilities.

13. A process as claimed in claim 12, wherein said step of regenerating said biomass includes aerating and mixing said biomass.

14. A process as claimed in claim 13, wherein said step of regenerating includes a further step of feeding said biomass.

15. A process as claimed in claim 12, wherein said wastewater treatment capabilities include the ability to remove nitrogen, phosphorous and chemical oxygen demand from said wastewater feedstock.

* * * * *